United States Patent
Hyun et al.

(10) Patent No.: US 11,037,333 B2
(45) Date of Patent: Jun. 15, 2021

(54) METHOD OF APPLYING GRAPHIC EFFECT AND ELECTRONIC DEVICE PERFORMING SAME

(71) Applicant: Samsung Electronics Co., Ltd., Suwon-si (KR)

(72) Inventors: Seung Jun Hyun, Seoul (KR); Seung Min Choi, Seongnam-si (KR); Min Sik Kim, Yongin-si (KR); Min Sung Lee, Suwon-si (KR); Song Hee Jung, Suwon-si (KR); Moo Young Kim, Seoul (KR); Ki Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/999,814

(22) PCT Filed: Feb. 13, 2017

(86) PCT No.: PCT/KR2017/001525
§ 371 (c)(1),
(2) Date: Aug. 20, 2018

(87) PCT Pub. No.: WO2017/142263
PCT Pub. Date: Aug. 24, 2017

(65) Prior Publication Data
US 2019/0244395 A1 Aug. 8, 2019

(30) Foreign Application Priority Data
Feb. 19, 2016 (KR) .................. 10-2016-0019435

(51) Int. Cl.
*G09G 5/02* (2006.01)
*G06T 7/90* (2017.01)
(Continued)

(52) U.S. Cl.
CPC ............ *G06T 11/001* (2013.01); *G06F 3/041* (2013.01); *G06F 3/048* (2013.01); *G06F 3/0414* (2013.01);
(Continued)

(58) Field of Classification Search
None
See application file for complete search history.

(56) References Cited

U.S. PATENT DOCUMENTS 7,894,000 B2 2/2011 Gutta et al.
8,068,178 B2 11/2011 Hardacker et al.
(Continued)

FOREIGN PATENT DOCUMENTS

EP 1 603 024 A2 12/2005
EP 2 799 984 A2 11/2014
(Continued)

OTHER PUBLICATIONS

European Search Report dated Dec. 20, 2018; European Appln. No. 17753424.5-1231 / 3396508.

*Primary Examiner* — Kyle Zhai
(74) *Attorney, Agent, or Firm* — Jefferson IP Law, LLP

(57) ABSTRACT

An electronic device according to an embodiment includes a display displaying content and a processor operatively connected to the display. The processor is configured to obtain information about an exterior color, to extract a dominant color from a specified area in an area in which the content is displayed, and to apply a gradation effect for transitioning from the exterior color to the dominant color, to at least part of an edge area of the display.

17 Claims, 13 Drawing Sheets

(51) Int. Cl.
*G06T 11/00* (2006.01)
*G06F 3/0485* (2013.01)
*G06F 3/048* (2013.01)
*G06F 3/041* (2006.01)
*G06F 3/0488* (2013.01)

(52) U.S. Cl.
CPC .......... *G06F 3/0485* (2013.01); *G06F 3/0488* (2013.01); *G06T 7/90* (2017.01); *G09G 5/02* (2013.01); *G06T 2200/24* (2013.01)

(56) References Cited

U.S. PATENT DOCUMENTS

| | | | |
|---|---|---|---|
| 8,462,276 B2 | 6/2013 | Lowe et al. | |
| 8,823,541 B2 | 9/2014 | Hardacker et al. | |
| 8,928,811 B2 | 1/2015 | Li et al. | |
| 8,934,059 B2 | 1/2015 | Lowe et al. | |
| 9,197,918 B2 | 11/2015 | Li et al. | |
| 9,603,204 B2 | 3/2017 | Sato | |
| 9,978,985 B2 | 5/2018 | Sato | |
| 2005/0264523 A1 | 12/2005 | Yoshida et al. | |
| 2007/0242162 A1 | 10/2007 | Gutta et al. | |
| 2007/0273791 A1* | 11/2007 | Lock | H04N 7/0122 348/561 |
| 2010/0079395 A1* | 4/2010 | Kim | G06F 1/1684 345/173 |
| 2010/0289666 A1 | 11/2010 | Hardacker et al. | |
| 2010/0289942 A1 | 11/2010 | Hardacker et al. | |
| 2010/0289957 A1 | 11/2010 | Hardacker et al. | |
| 2011/0018462 A1 | 1/2011 | Lowe et al. | |
| 2011/0141336 A1* | 6/2011 | Mittleman | G02B 5/005 348/340 |
| 2011/0279731 A1 | 11/2011 | Hardacker et al. | |
| 2013/0278841 A1 | 10/2013 | Lowe et al. | |
| 2014/0104245 A1 | 4/2014 | Li et al. | |
| 2014/0215373 A1* | 7/2014 | Shih | G06F 3/04855 715/771 |
| 2014/0320516 A1 | 10/2014 | Son et al. | |
| 2015/0092110 A1 | 4/2015 | Li et al. | |
| 2015/0177962 A1 | 6/2015 | Seong et al. | |
| 2015/0223297 A1 | 8/2015 | Sato | |
| 2015/0323963 A1* | 11/2015 | Tokutake | G06F 1/1628 345/173 |
| 2015/0334367 A1* | 11/2015 | Stransky-Heilkron | H04N 13/122 348/43 |
| 2017/0018105 A1 | 1/2017 | Hasegawa et al. | |
| 2017/0133627 A1 | 5/2017 | Sato | |
| 2017/0263204 A1* | 9/2017 | Tanaka | G09G 3/3688 |

FOREIGN PATENT DOCUMENTS

| | | |
|---|---|---|
| EP | 2 955 613 A1 | 12/2015 |
| JP | 2015-179502 A | 10/2015 |
| KR | 10-2009-0076649 A | 7/2009 |
| KR | 10-2015-0018123 A | 2/2015 |

\* cited by examiner

METHOD OF APPLYING GRAPHIC EFFECT AND ELECTRONIC DEVICE PERFORMING SAME

TECHNICAL FIELD

The present disclosure relates to a method of applying a graphic effect to a display and an electronic device performing the same.

BACKGROUND ART

Various types of electronic devices, such as a smartphone, a wearable device, and the like have been widely distributed since the spread of a personal computer (PC). Various types of user interfaces (UIs) have been applied to the electronic devices to interact with a user.

For example, an electronic device may include a touch display capable of operating an input means for receiving an input from the user, as well as a visual display means. The user may easily and intuitively enter a user input through a graphic user interface (GUI), which is implemented through the touch display.

DISCLOSURE

Technical Problem

Embodiments disclosed in the present disclosure may relate to a method of applying a graphic effect, and may provide a method of adaptively applying a specified graphic effect (e.g., gradation effect) to an edge area of the display of an electronic device and an electronic device performing the same.

Technical Solution

According to an embodiment disclosed the present disclosure, an electronic device may include a display displaying content and a processor operatively connected to the display. The processor may be configured to obtain information about an exterior color, to extract a dominant color from a specified area in an area in which the content is displayed, and to apply a gradation effect for transitioning from the exterior color to the dominant color, to at least part of an edge area of the display.

In addition, according to an embodiment disclosed the present disclosure, a graphic effect applying method of an electronic device may include displaying content on a display, obtaining information about an exterior color, extracting a dominant color from a specified area in an area in which the content is displayed, and applying a gradation effect for transitioning from the exterior color to the dominant color, to at least part of an edge area of the display.

Other aspects, advantages, and salient features of the disclosure will become apparent to those skilled in the art from the following detailed description, which, taken in conjunction with the annexed drawings, discloses various embodiments of the present disclosure.

Advantageous Effects

According to an embodiment disclosed in the present disclosure, an electronic device may provide a more integrated design language between a display and housing by applying a gradation effect to the edge area of the display. Furthermore, an optical illusion effect that the display extends toward the outside of the bezel (a part of the housing) may be provided. Besides, a variety of effects directly or indirectly understood through the present disclosure may be provided.

MODE FOR INVENTION

Figure 1:
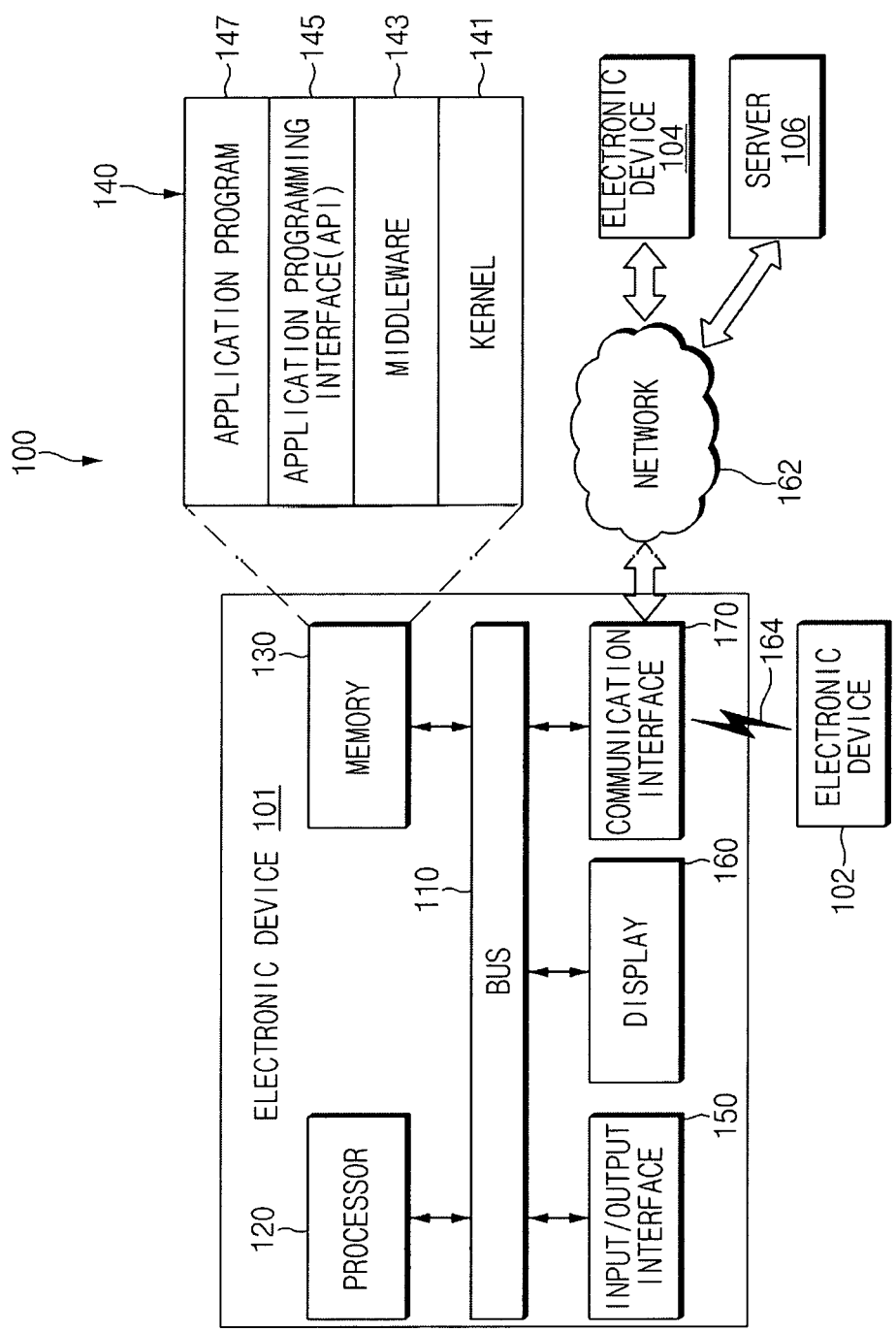
FIG. 1 illustrates an electronic device in a network environment, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication circuit 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (A?), or a communication processor (CP). For example, the processor 120 may be operatively connected to other components 110 to 170 so as to perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101.

According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data. Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may display, for example, various pieces of content (e.g., a text, an image, a video, an icon, a symbol, and the like) to a user. In the display 160, an area in which a user is capable of visually recognizing may be referred to a "content display area or screen". The content display area of the display 160 may form a single area or may be logically divided into a plurality of areas. For example, the content display area of the display 160 may be divided into two areas. In this case, the first area and the second area may display, for example, different pieces of content. For another example, the first area may continuously display a part of content being displayed in the second area (i.e., the first area and the second area may be regarded as one area).

According to an embodiment, the display 160 may include a touch panel capable of receiving the touch input of a user, and/or a pressure sensor capable of detecting the pressure of the touch input. For example, the display 630 may obtain a touch, gesture, proximity, or hovering input using an electronic pen or a part of the user's body (e.g., finger).

The display 160 may include, for example, a liquid crystal display (LCD), a light-emitting diode (LED) display, an organic LED (OLED) display, a microelectromechanical systems (MEMS) display, or an electronic paper display. The configuration and the function operation of display 160 will be described with reference to FIGS. 2 to 4.

For example, the communication circuit 170 may establish communication between the electronic device 101 and an external device (e.g., the first external electronic device 102, the second external electronic device 104, or the server 106). For example, the communication circuit 170 may be connected to the network 162 over wireless communication or wired communication to communicate with the external device (e.g., the second external electronic device 104 or the server 106).

The wireless communication may include cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, the short range communication 164. The short range communication 164 may include at least one of wireless fidelity (Wi-Fi), Bluetooth, Bluetooth low energy (BLE), near field communication (NFC), magnetic secure transmission (MST), radio frequency (RF), a body area network (BAN), or a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
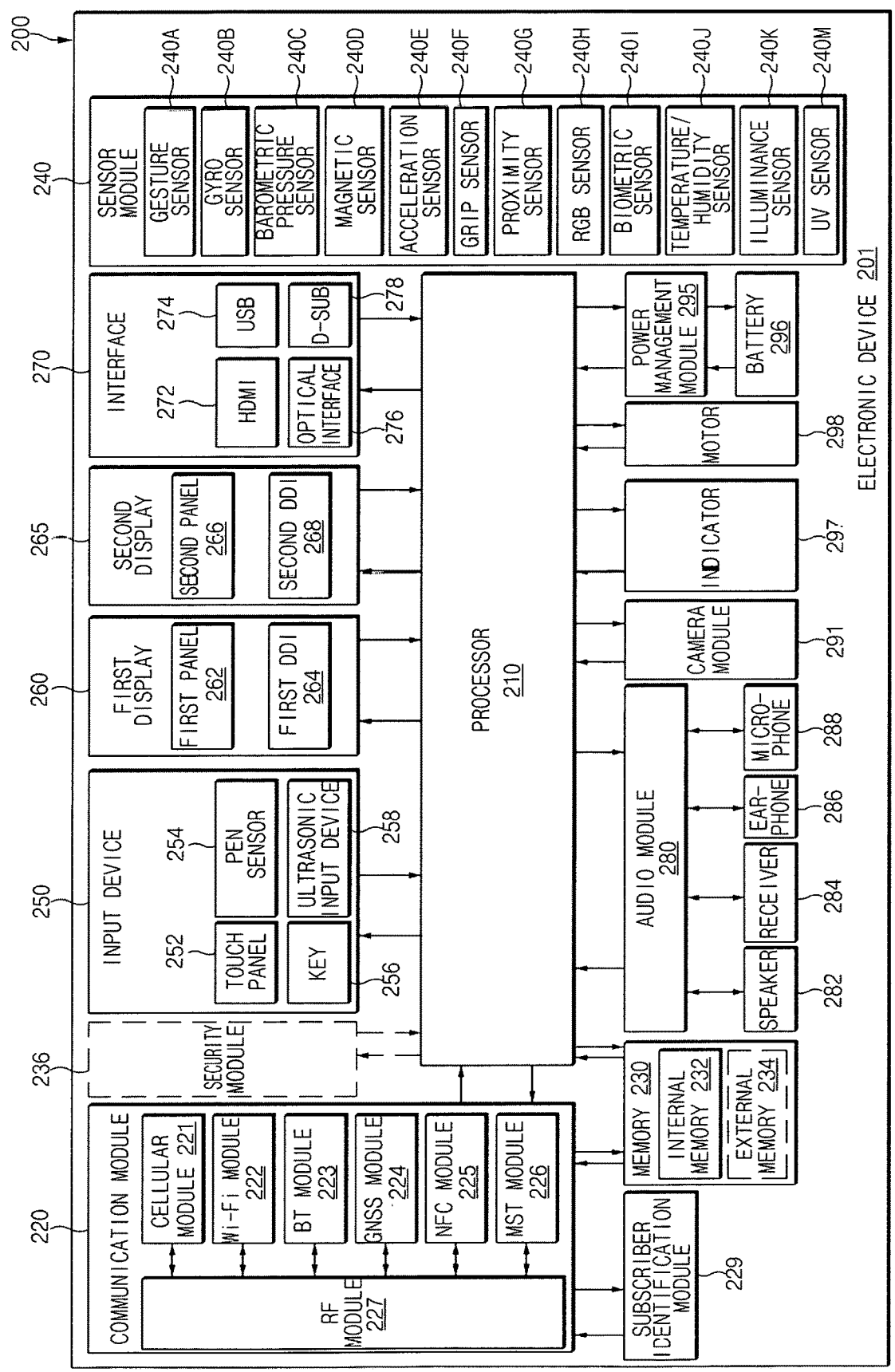
FIG. 2 illustrates a block diagram of the electronic device, according to various embodiments.

FIG. 2 illustrates a block diagram of an electronic device, according to an embodiment.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication circuit 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display (e.g., the display 160) may include a first display 260 and/or a second display 265. An embodiment is exemplified in FIG. 2 as the electronic device 201 includes a plurality of displays 260 and 265. According to various embodiments, the display may include a single display.

The first display 260 may include a first panel 262 and a first display driver IC (DDI) 264 controlling the first panel 262. The second display 265 may include a second panel 266 and a second DDI 268 controlling the second panel 266.

Each of the first panel 262 and the second panel 266 may include a plurality of pixels. Each of the plurality of pixels may include sub-pixels for displaying red, green, and blue (RGB) colors, which are the three primary colors. Each of the sub-pixels may include at least one transistor and may adjust brightness depending on the magnitude of voltage or current, which is applied to the transistor, to express the color.

Each of the first DDI 264 and the second DDI 268 may include a gate driver circuit unit and a source driver circuit unit. The gate driver circuit unit may perform an On/Off function and may control the gate of a sub-pixel. The source driver circuit unit may adjust an image signal supplied to the sub-pixel to generate the difference of output colors and may adjust the transistor of the sub-pixel to provide the full screen of a display.

The first DDI 264 and the second DDI 268 may receive image data from the processor 210 to display the first panel 262 and the second panel 266, respectively. For example, the first DDI 264 may provide the first image data, which is supplied from the processor 210, to the first panel 262 to operate such that an image is displayed on the first panel 262. The second DDI 268 may provide the second image data (the same as or different from the first image data) supplied from the processor 210 to the second panel 266 to operate such that an image is displayed on the second panel 266.

According to various embodiments, for example, at least one of the first panel 262 or second panel 266 may be implemented to be flat, transparent, flexible, or bendable. At least one of the first panel 262 or second panel 266 may include the touch panel 252 and/or the pen sensor 254 or may be implemented with one module. According to various embodiments or according to an embodiment, at least one of the first panel 262 or the second panel 266 may include a pressure sensor (or a force sensor) capable of measuring the intensity of pressure associated with the touch of the user. The pressure sensor may be integrally implemented with the touch panel 252 or may be implemented with one or more sensors independently of the touch panel 252.

According to various embodiments, various types of image output schemes may be applied to the first display 260 and/or the second display 265. For example, the first display 260 and/or the second display 265 may include the hologram device displaying a stereoscopic image in a space using a light interference phenomenon or a projector projecting light onto a screen so as to display an image. For example, the screen may be arranged inside or outside the electronic device 201. According to an embodiment, the first display 260 and/or the second display 265 may further include a control circuit for controlling the hologram device or the projector.

Meanwhile, in an embodiment including a plurality of displays, the processor 210 may process data, a command, or the like (e.g., image data, image data stream, or the like), which is transmitted or received to or from the types of modules and devices included in the electronic device 201. For example, the processor 210 may determine to output content to at least one of the first display 260 or the second display 265. For example, under control of the processor 210, the first display 260 may output data received from the communication module 220, or the second display 265 may output data received from the sensor module 240. For another example, the processor 210 may change the first display 260 to the second display 265 to output the content, which is output to the first display 260, to the second display 265; or the processor 210 may output the content, which is output to the first display 260, to the second display 265 such that the content is expanded. On the other hand, the processor 210 may change the second display 265 to the first display 260 to output the content, which is output to the second display 265, to the first display 260; or the processor 210 may output the content, which is output to the second display 265, to the first display 260 such that the content is expanded.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication circuit 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
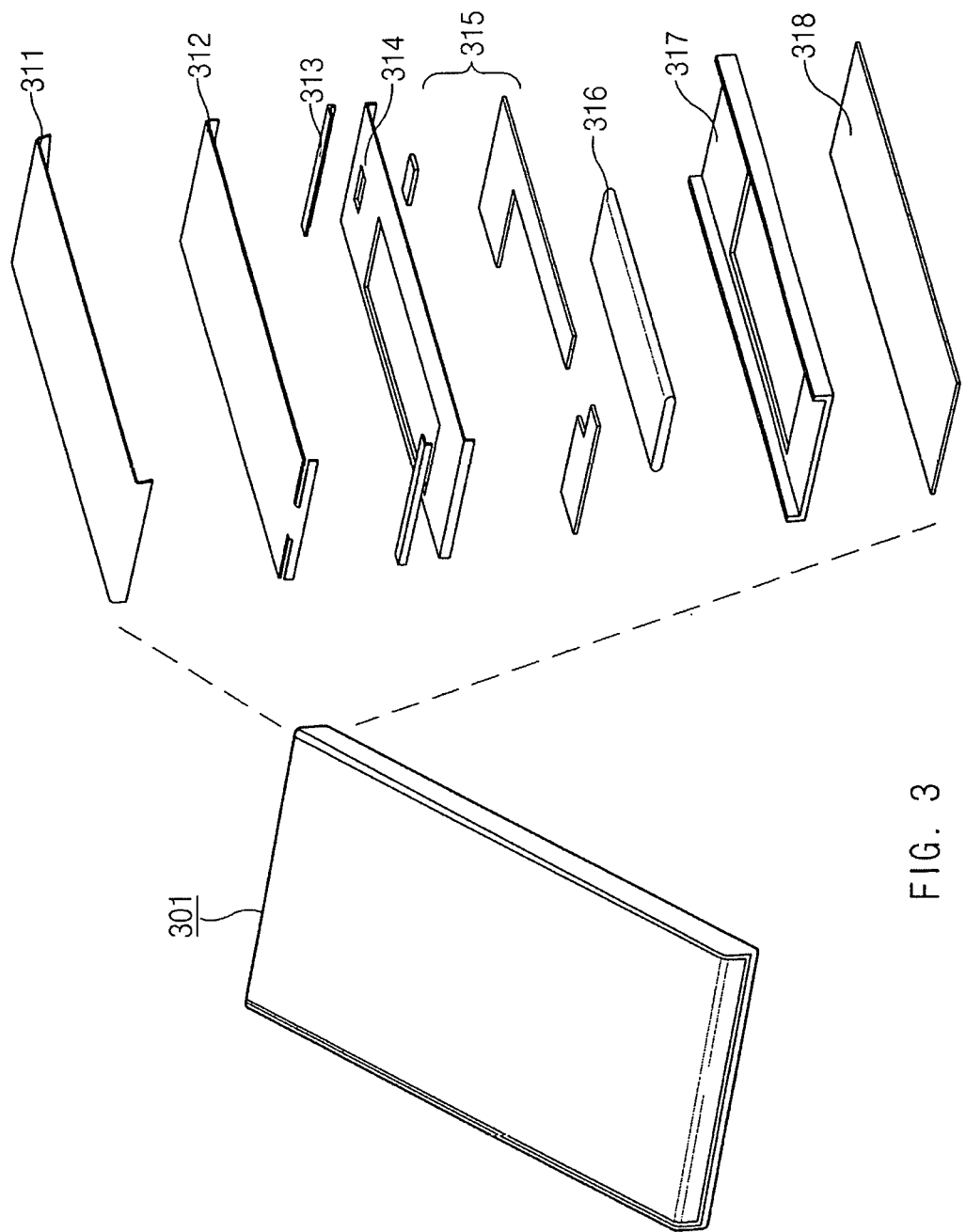
FIG. 3 illustrates an internal configuration of an electronic device, according to an embodiment.

FIG. 3 illustrates an internal configuration of an electronic device, according to an embodiment.

Referring to FIG. 3, an electronic device 301 according to an embodiment may include a display 311, a metal sheet 312, a feeding circuit 313, a bracket 314, a circuit board 315, a battery 316, a housing 317, and a rear cover 318.

Figure 4:
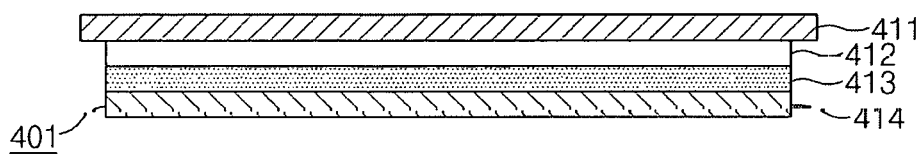
FIG. 4 illustrates a sectional view of a display, according to an embodiment.

For example, the display 311 may correspond to the display 160 of FIG. 1, the first display 260 of FIG. 2, or the second display 265 of FIG. 2. The display 311 may constitute at least part of the front surface of the electronic device 301. In FIG. 4, the configuration of the display 311 will be described in detail.

The metal sheet 312 may be coupled to the bottom surface of the display 311. The metal sheet 312 may block electromagnetic waves such that the electromagnetic waves generated by the operation of the display 311 do not affect the internal configuration of the electronic device 301 (e.g., the circuit board 315, or the like). According to various embodiments, the metal sheet 312 may be referred to as a "display ground".

The feeding circuit 313 may feed an antenna for wireless communication of the electronic device 301. According to an embodiment, a component such as an antenna radiator, an amplifier, an oscillator, a filter, or the like may be connected to the feeding circuit 313 or may be mounted in the feeding circuit 313. According to various embodiments, the metal sheet 312 may be referred to as a "feeding flexible printed circuit board (feeding FPCB)".

The bracket 314 may physically support various components embedded in the electronic device 301.

For example, the circuit board 315 may include a main circuit board, a sub circuit board, and a connector electrically connecting between the main circuit board and the sub circuit board. For example, the circuit board 315 may be implemented with a Printed Circuit Board (PCB), a FPCB, or the like. According to various embodiments, the circuit board 315 may be referred to as a "main board".

The battery 316 may convert chemical energy and electrical energy bidirectionally. For example, the battery 316 may convert chemical energy into electrical energy to supply the converted electrical energy to the display 311, the feeding circuit 313, and/or various modules mounted in the circuit board 315. Alternatively, the battery 316 may convert electrical energy from the outside into chemical energy and store the converted chemical energy. The circuit board 315 may include a power management module for managing charging and discharging of the battery 316.

For the purpose of protecting various components in the electronic device 301 from an external shock or dust, the housing 317 may be formed of a plastic injection molding material, and/or a metal material. According to various embodiments, at least part of the housing 317 may be made of metal. For example, in the case where the side surface of the housing 317 is formed of metal, a so-called metal bezel may be implemented. According to various embodiments, at least part of the metallic portion of the housing 317 may be used as an antenna radiator.

The rear cover 318 may be coupled to the rear surface (a surface opposite to a surface on which the display 311 is arranged) of the housing 317. The rear cover 318 may be formed of tempered glass, a plastic injection-molding material, and/or a metal material. According to an embodiment, the rear cover 318 may be integrated with the housing 317 or may be implemented to be removable by the user.

FIG. 4 illustrates a sectional view of a display, according to an embodiment.

Referring to FIG. 4, the sectional view of a display 401 according to various embodiments, which is capable of being mounted in an electronic device, is illustrated. The display 401 may include a cover glass 411, a touch panel 412, a display panel 413, and a pressure sensor 414. For example, at least one of the cover glass 411, the touch panel 412, the display panel 413, and the pressure sensor 414 may adhere to another component with optical clean adhesive (OCA).

Light generated by the display panel 413 may pass through the cover glass 411. For example, a user may perform a touch input (including an input using an electronic pen) on the cover glass 411 by using a portion (e.g., a finger) of his/her body. The cover glass 411 may be formed of, for example, tempered glass, reinforced plastic, a flexible polymer material, or the like and may protect the display 401 or the electronic device equipped with the display 401 from an external shock.

The touch panel 412 may receive a touch input from the user. For example, if a portion of user's body (e.g., a finger), a stylus (an example of an electronic pen), or the like contacts the touch panel 412, the touch input may be received by sensing the change in the amount of charge on the touch panel 412 (capacitive touch panel). According to various embodiments, the touch panel 412 may use at least one of resistive, infrared, and ultrasonic detecting methods, in addition to the capacitive method. According to various embodiments, the touch panel 412 may be referred to as various names, such as a touch screen panel (TSP), a touch sensor, or the like.

The display panel 413 may output content (e.g., a text, an image, a video, an icon, a widget, a symbol, or the like). For example, the display panel 413 may include a liquid crystal display (LCD) panel, a light-emitting diode (LED) display panel, an organic LED (OLED) display panel, a microelectromechanical systems (MEMS) display panel, or an electronic paper display panel.

The pressure sensor 414 (or "force sensor") may detect the pressure of the touch input of the user. For example, the pressure sensor 414 may detect a pressure value of the touch input (including an input using an electronic pen) received from a portion (e.g., a finger) of the user's body.

For example, the pressure sensor 414 may detect the pressure of the touch input based on the capacitance changed depending on the touch input of a user (so-called, a capacitive pressure sensor). For another example, the pressure sensor 414 may detect the pressure of the touch input by recognizing a contact area where a user performs the touch input. Besides, the pressure sensor 414 may sense the pressure of the touch input in various manners. For example, the pressure sensor 414 may be implemented with a resistive pressure sensor, a piezo pressure sensor, or the like.

The stacked structure of the display 401 illustrated in FIG. 4 is an example and is able to be variously modified. For example, the touch panel 412 may be formed directly on a rear surface of the cover glass 411 (a so-called cover glass integrated touch panel), may be inserted between the cover glass 411 and the display panel 413 after being separately manufactured (a so-called add-on touch panel), may be formed directly on the display panel 413 (a so-called on-cell touch panel), or may be included inside the display panel 413 (a so-called in-cell touch panel).

For another example, the pressure sensor 414 may be positioned in the same layer of the touch panel 412 or may be included inside the display panel 413. In addition, an embodiment is exemplified in FIG. 4 as the pressure sensor 414 is formed of one layer. However, the pressure sensor 414 may be implemented with a plurality of sensor modules and may be positioned on the rear surface of the display panel 413.

Figure 5:
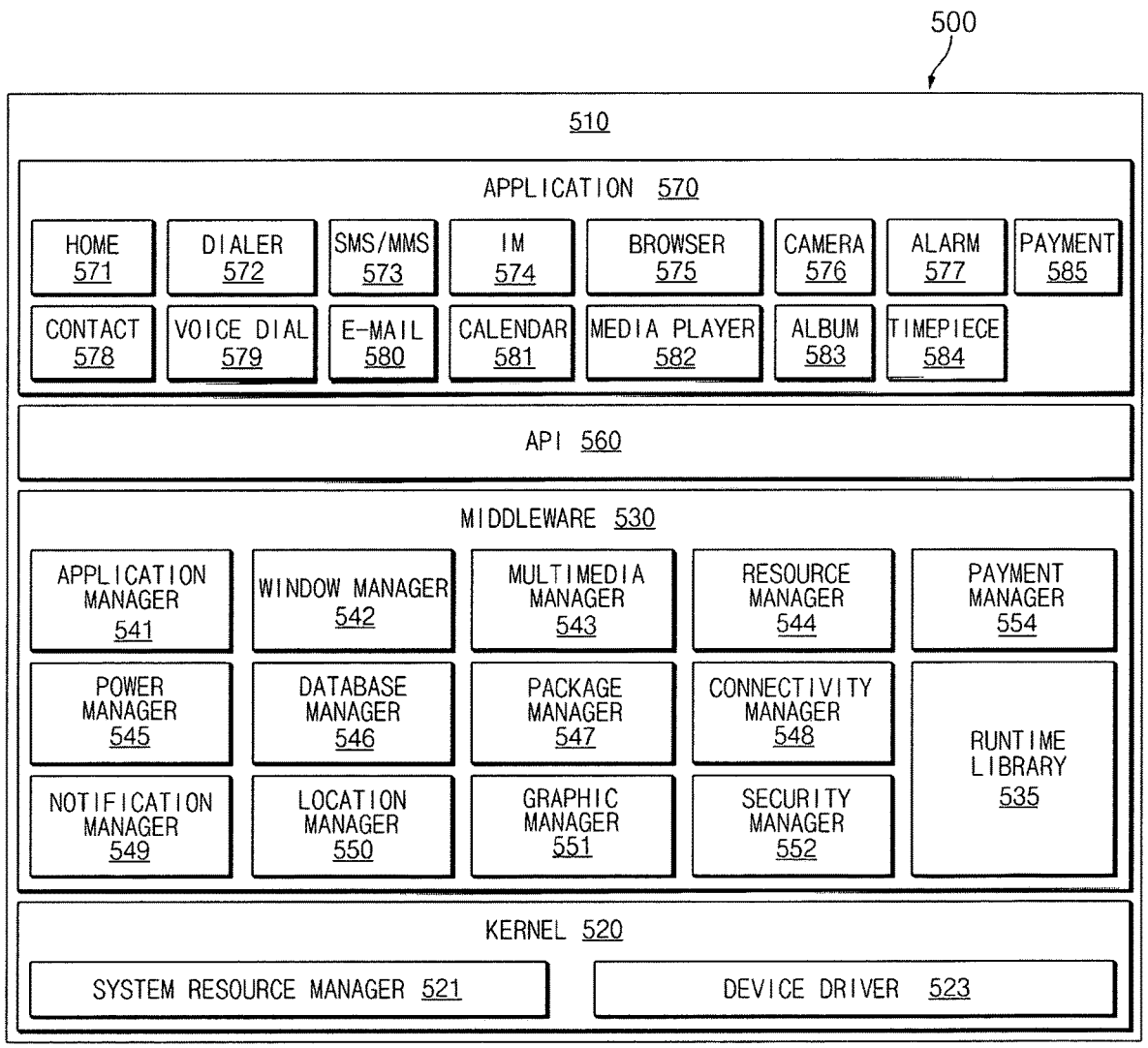
FIG. 5 is a block diagram of a program module according to various embodiments.

FIG. 5 illustrates a block diagram of a program module, according to various embodiments.

According to an embodiment, a program module 510 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™.

The program module 510 may include a kernel 520, a middleware 530, an application programming interface (API) 560, and/or an application 570. At least a portion of the program module 510 may be preloaded on an electronic device or may be downloadable from an external electronic device (e.g., the electronic device 102 or 104, the server 106, or the like).

The kernel 520 (e.g., the kernel 141) may include, for example, a system resource manager 521, or a device driver 523. The system resource manager 521 may perform control, allocation, or retrieval of system resources. According to an embodiment, the system resource manager 521 may include a process managing part, a memory managing part, or a file system managing part. The device driver 523 may include, for example, a display driver, a camera driver, a Bluetooth driver, a common memory driver, a USB driver, a keypad driver, a Wi-Fi driver, an audio driver, or an inter-process communication (IPC) driver. The display driver may control at least one or more DDIs (e.g., the first DDI 264 and the second DDI 268 of FIG. 2). For example, the display driver may perform functions to control the DDI in response to the request of the application 570.

The middleware 530 may provide, for example, a function that the application 570 needs in common, or may provide diverse functions to the application 570 through the API 560 to allow the application 570 to efficiently use limited system resources of the electronic device. According to an embodiment, the middleware 530 (e.g., the middleware 143) may include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, a security manager 552, or a payment manager 554.

The runtime library 535 may include, for example, a library module that is used by a compiler to add a new function through a programming language while the application 570 is being executed. The runtime library 535 may perform input/output management, memory management, or capacities about arithmetic functions.

The application manager 541 may manage, for example, a life cycle of at least one application of the application 570. The window manager 542 may manage a GUI resource which is used in a screen. For example, in the case where the electronic device includes a plurality of displays (e.g., the first display 260 and the second display 265 of FIG. 2), the window manager 542 may independently manage the screen (e.g., the output ratio of the screen) of each display, depending on the operation of the application 570. The multimedia manager 543 may identify a format necessary to play diverse media files, and may perform encoding or decoding of media files by using a codec suitable for the format. The resource manager 544 may manage resources such as a storage space, memory, or source code of at least one application of the application 570.

The power manager 545 may operate, for example, with a basic input/output system (BIOS) to manage a battery or power, and may provide power information for an operation of an electronic device. The database manager 546 may generate, search for, or modify database that is to be used in at least one application of the application 570. The package manager 547 may install or update an application that is distributed in the form of package file.

The connectivity manager 548 may manage, for example, wireless connection such as Wi-Fi or Bluetooth. The notification manager 549 may display or notify an event such as arrival message, appointment, or proximity notification in a mode that does not disturb a user. The location manager 550 may manage location information about an electronic device. The graphic manager 551 may manage a graphic effect that is provided to a user, or manage a user interface relevant thereto. The security manager 552 may provide a general security function necessary for system security, user authentication, or the like. According to an embodiment, in the case where an electronic device (e.g., the electronic device 101) includes a telephony function, the middleware 530 may further include a telephony manager for managing a voice or video call function of the electronic device.

The middleware 530 may include a middleware module that combines diverse functions of the above-described components. The middleware 530 may provide a module specialized to each OS kind to provide differentiated functions. Additionally, the middleware 530 may dynamically remove a part of the preexisting components or may add new components thereto.

The API 560 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 570 (e.g., the application program 147) may include, for example, one or more applications capable of providing functions for a home 571, a dialer 572, an SMS/MMS 573, an instant message (IM) 574, a browser 575, a camera 576, an alarm 577, a contact 578, a voice dial 579, an e-mail 580, a calendar 581, a media player 582, an album 583, a timepiece 584, and a payment 585 or for offering health care (e.g., measuring an exercise quantity, blood sugar, or the like) or environment information (e.g., information of barometric pressure, humidity, temperature, or the like).

According to an embodiment, the application 570 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device (e.g., the electronic device 102 or 104) itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 570 may include an application (e.g., a health care application of a mobile medical device) that is assigned in accordance with an attribute of an external electronic device (e.g., the electronic device 102 or 104). According to an embodiment, the application 570 may include an application that is received from an external electronic device (e.g., the electronic device 102 or 104, or the server 106). According to an embodiment, the application 570 may include a preloaded application or a third party application that is downloadable from a server. The names of components of the program module 510 according to the embodiment may be modifiable depending on kinds of operating systems.

According to various embodiments, at least a portion of the program module 510 may be implemented by software, firmware, hardware, or a combination of two or more thereof. At least a portion of the program module 510 may be implemented (e.g., executed), for example, by the processor (e.g., the processor 210). At least a portion of the program module 510 may include, for example, modules, programs, routines, sets of instructions, processes, or the like for performing one or more functions.

Figure 6:
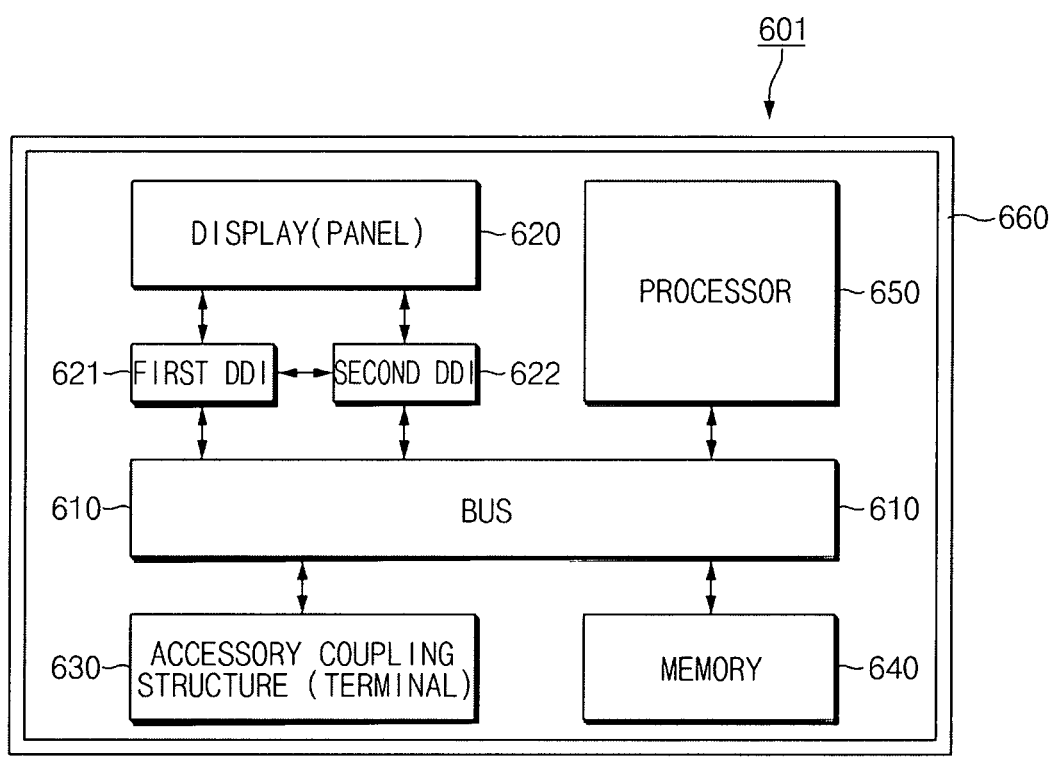
FIG. 6 is a block diagram illustrating an electronic device, according to an embodiment of the present disclosure.

FIG. 6 is a block diagram illustrating an electronic device, according to an embodiment of the present disclosure.

Referring to FIG. 6, an electronic device 601 according to an embodiment may include a bus 610, a display (panel) 620, a first DDI 621 and a second DDI 622, an accessory coupling structure (terminal) 630, a memory 640, a processor 650, and a housing 660. According to various embodiments, the electronic device 601 may not include at least one of the above-described elements or may further include any other element(s) (refer to FIGS. 1 to 5).

For example, the bus 610 (corresponding to the bus 110 of FIG. 1) may connect the components included in the electronic device 601 to each other and may include a circuit conveying communication among components.

The display (panel) 620 (e.g., corresponding to the display 160 of FIG. 1, the display 260 or 265 of FIG. 2, or the display 401 of FIG. 4) may display content (e.g., a text, an image, a video, an icon, a symbol, or the like) under control of the processor 650. The display 620 may include pixels, which are arranged in a plurality of rows and a plurality of columns, based on the set resolution.

According to an embodiment, the display 620 may include a touch panel for receiving the user's touch input and a pressure sensor for detecting the pressure of the touch input (refer to FIG. 4).

Figure 7:
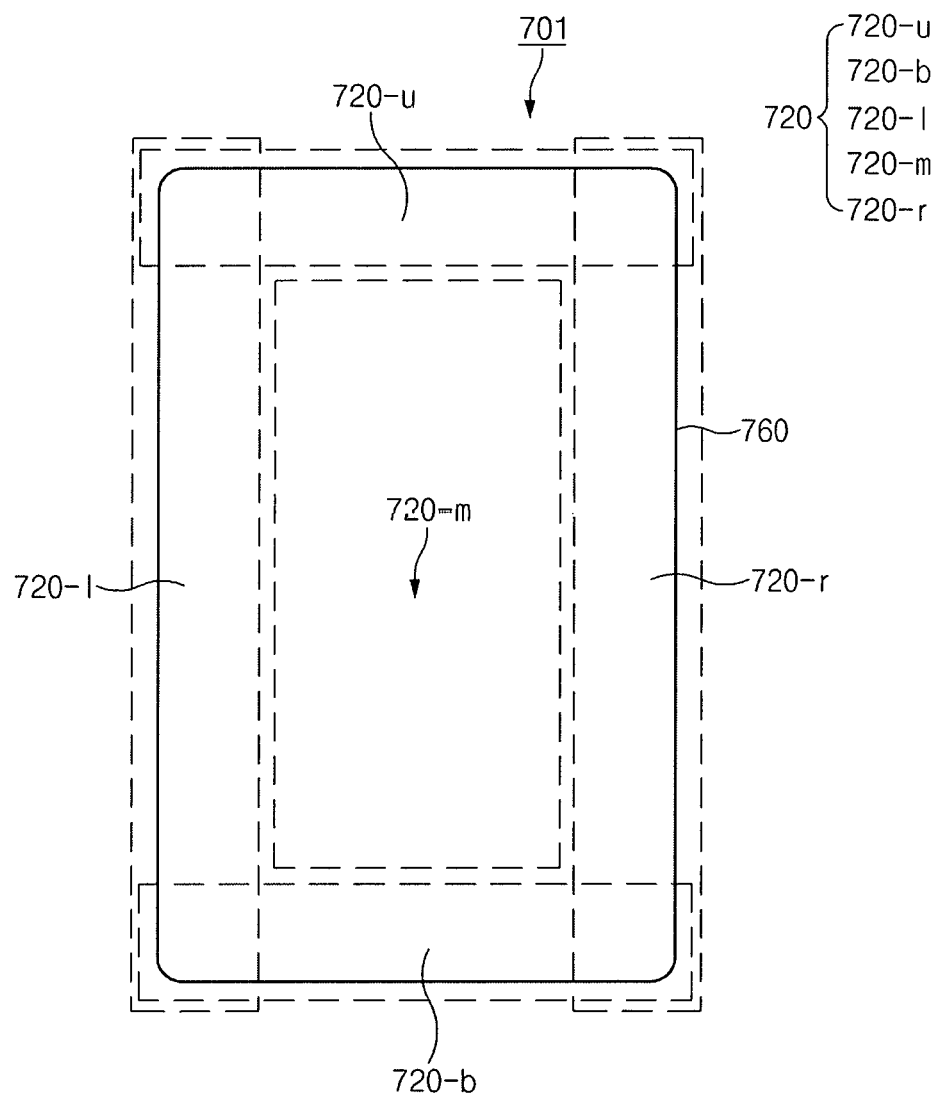
FIG. 7 illustrates a display of an electronic device, according to an embodiment.

FIG. 7 illustrates a display of an electronic device, according to an embodiment.

Referring to FIG. 7, the exterior appearance of the front surface of an electronic device 701 according to an embodiment is illustrated. The front surface of the electronic device 701 may include a display 720 and a housing 760. The housing 760 may be coupled to the display 720. The front surface of the housing 760 may be referred to as a "bezel" in that the housing 760 surrounds the display 720 in the front surface of the electronic device 701.

The display 720 may be divided into a main area 720-*m* and edge areas 720-*u*, 720-*b*, 720-*l*, and 720-*r*, in a content output area (or screen). The edge area may correspond to an area having a specified width toward the inside of the display 720 from the outer boundary of the display 720. The edge area may include the upper side edge area 720-*u*, the bottom side edge area 720-*b*, the left side edge area 720-*l*, and the right side edge area 720-*r*, depending on the positioned portion. The graphic effect according to various embodiments of the present disclosure may be applied to the edge areas 720-*u*, 720-*b*, 720-*l*, and 720-*r*.

Returning to FIG. 6, the first DDI 621 and the second DDI 622 may drive the display 620. For example, the first DDI 621 and the second DDI 622 may correspond to the first DDI 264 and the second DDI 268 illustrated in FIG. 2, respectively. Moreover, in an embodiment, unlike FIG. 6, an electronic device may include a single DDI.

For example, the first DDI 621 and the second DDI 622 may supply the display 620 with an image signal corresponding to image data received from the processor 650 (a host) at the preset frame rate. Although not illustrated in FIG. 6, according to various embodiments, the first DDI 621 and the second DDI 622 may include a graphics RAM, an interface module, an image processing unit, a multiplexer, a display timing controller (T-con), a source driver, a gate driver, an oscillator, or the like.

According to an embodiment, each of the first DDI 621 and the second DDI 622 may perform graphic processing on an image to be displayed in the main area (e.g., 720-*m* of FIG. 7) of the display 620 and an image to be displayed in an edge area (e.g., the edge area 720-*u*, 720-*b*, 720-*l*, or 720-*r* of FIG. 7), under control of the processor 650.

According to another embodiment, the second DDI 622 may be dependent on the first DDI 621. For example, when the processor 650 transmits graphic data, which is to be displayed on the display 620, to the first DDI 621, the first DDI 621 may perform graphic processing on the main area based on the received graphic data and may transmit the processed result to the second DDI 622. The second DDI 622 may perform graphic processing on an image to be displayed in the edge area, based on the data received from the first DDI 621.

The accessory coupling structure (terminal) 630 may provide an interface that allows an external accessory to be physically or electrically coupled to the electronic device 601. According to an embodiment, it is understood that the accessory coupling structure 630 includes the input/output interface 150 of FIG. 1.

For example, the processor 650 may determine whether the external accessory is detachable, the type of the external accessory, the color of the external accessory, or the like by transmitting or receiving a specified signal to or from the external accessory through the accessory coupling structure 630.

The external accessory may include various members capable of being mounted in or connected to the electronic device 601. For example, the external accessory may include a case capable of surrounding at least part of the exterior appearance of the electronic device 601. According to an embodiment, in the case where the electronic device 601 is implemented with a smart watch, the external accessory may include a band (or fob) capable of being coupled to the smart watch.

The memory 640 may store commands or data associated with operations of components included in the electronic device 601. For example, when executed, the memory 640 may store instructions that cause the processor 650 to perform various operations described in the present disclosure. According to an embodiment, the memory 640 may store color information of the housing 660.

For example, the processor 650 may be operatively connected to components included in the electronic device 601 through the bus 610 and may execute operations or data processing associated with control and/or communication of the components included in the electronic device 601.

According to an embodiment, the processor 650 may obtain information about an exterior color and may extract a dominant color from a specified area in the content display area (or screen) of the display 620. The processor 650 may apply a gradation effect for transitioning from the exterior color to the dominant color, to at least part (e.g., at least one of the upper side edge area and the bottom side edge area) of the edge area of the display 620.

According to an embodiment, the processor 650 may read information about the color of the housing 660 from the memory 640 and may obtain the information about the color of the housing 660 as information about the exterior color. According to another embodiment, the processor 650 may obtain information about the color of the external accessory as information about the exterior color, by transmitting or receiving a specified signal to or from the external accessory through the accessory coupling structure 630.

According to an embodiment, when extracting the dominant color, the processor 650 may calculate a ratio of pixels, displaying a color having the highest occupancy, to a plurality of pixels constituting the specified area and may determine the corresponding color as a dominant color.

According to another embodiment, the specified area may be composed of pixels arranged in a plurality of rows and a plurality of columns. In this case, the processor 650 may extract the dominant color for each of the plurality of columns and may apply the gradation effect based on the extracted plurality of dominant color.

According to an embodiment, when the content included in the specified area is changed depending on the user input, the processor 650 may extract the dominant color again from the specified area. Accordingly, the dominant color for applying the gradation effect may be updated. That is, the processor 650 may adaptively apply the gradation effect to the edge area.

According to an embodiment, the processor 650 may adjust the weight of the exterior color or the dominant color in the gradation effect, depending on the user input. For example, in the case where the scrolling (an example of a user input) for changing an area, in which content is displayed, to a specified direction is received, the processor 650 may increase or decrease the ratio of the dominant color in the gradation effect, depending on the speed of the user input. For another example, in the case where a touch input (so-called, 'force touch') (an example of a user input) having a specific pressure is received through the display 620, the processor 650 may increase or decrease the ratio of the dominant color in the gradation effect, depending on the pressure of the touch input.

According to various embodiments, in the case where a specified condition is satisfied, the processor 650 may be configured to apply the gradation effect. For example, in the case where the aspect ratio of content to be displayed on the display 620 does not coincide with the aspect ratio the display 620, the processor 650 may apply the gradation effect. In the case where the resolution of the content to be displayed on the display 620 is 640×480 and the resolution of the display 620 is 1920×1080, since the aspect ratio of the content is 4:3 and aspect ratio of the display 620 is 16:9, the processor 650 may apply the gradation effect to the edge area.

Moreover, according to various embodiments, the processor 650 may control graphic outputs associated with the main area (e.g., 720-m of FIG. 7) in which the content is displayed and the edge area (e.g., the edge areas 720-u, 720-b, 720-l, and 720-r of FIG. 7) to which the gradation effect is applied, through different DDIs. For example, the processor 650 may control the graphic output of the edge area through at least one (e.g., the first DDI 621) of a plurality of DDIs and may control the graphic output of the main area through a DDI (e.g., the second DDI 622) different from the DDI of the at least one.

The above-described operations of the processor 650 are, but are not limited to, an example. For example, it is understood that the operation of a "processor" written in another portion of the present disclosure is the operation of the processor 650. In addition, it is understood that at least part of operations written as the operation of the "electronic device" is the operation of the processor 650.

The housing 660 may protect various components in the electronic device 601 from an external shock or dust. For example, the housing 660 may be formed of a plastic injection molding material and/or a metal material. According to an embodiment, the housing 660 may constitute at least part of the external appearance of the electronic device 601 and may be physically coupled to the display 620.

Figure 8:
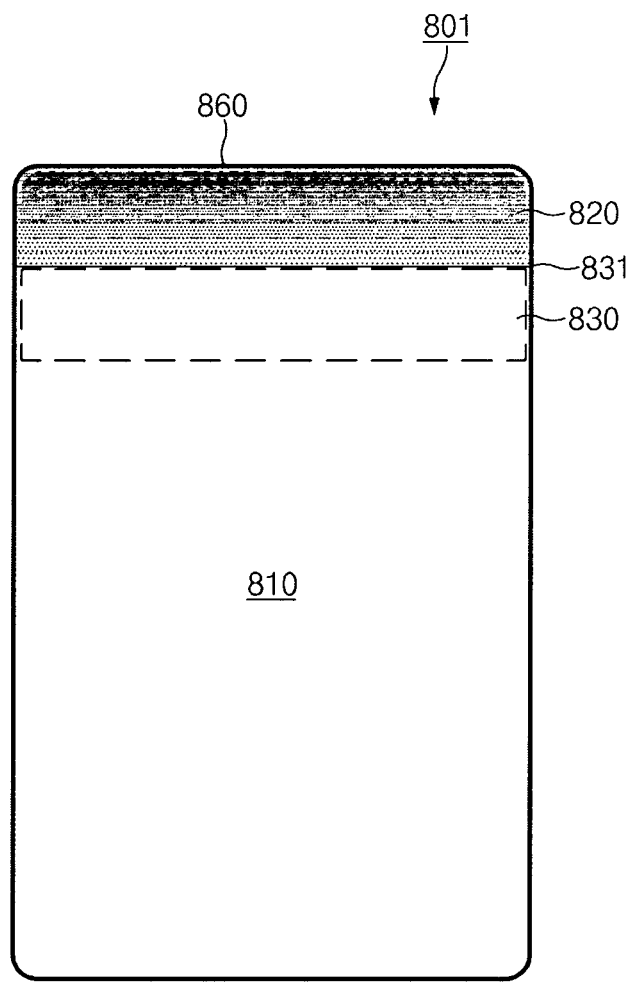
FIG. 8 is a view for describing a method of applying a graphic effect, according to an embodiment.

FIG. 8 is a view for describing a method of applying a graphic effect, according to an embodiment.

Referring to FIG. 8, the front surface of an electronic device 801 is illustrated. The front surface of the electronic device 801 may include a display 810 and a housing 860 surrounding the display.

The processor of the electronic device 801 may read information about the color of the housing 860 (or bezel) from the memory of the electronic device 801 and may obtain information about the color of the housing 860 as information about an exterior color.

Afterwards, the processor of the electronic device 801 may extract a dominant color from a specified area 830 in the content display area (or screen) of the display 810.

The processor of the electronic device 801 may apply a gradation effect for transitioning from the exterior color (i.e., the color of the housing 860) to the dominant color, to an upper side edge area 820 of the display 810. For example, in the gradation effect, the color transition of the exterior color may start from the boundary between the housing 860 and the display 810, and the dominant color may start the color transition from the boundary 831 between the upper side edge area 820 and the specified area 830.

Figure 9A:
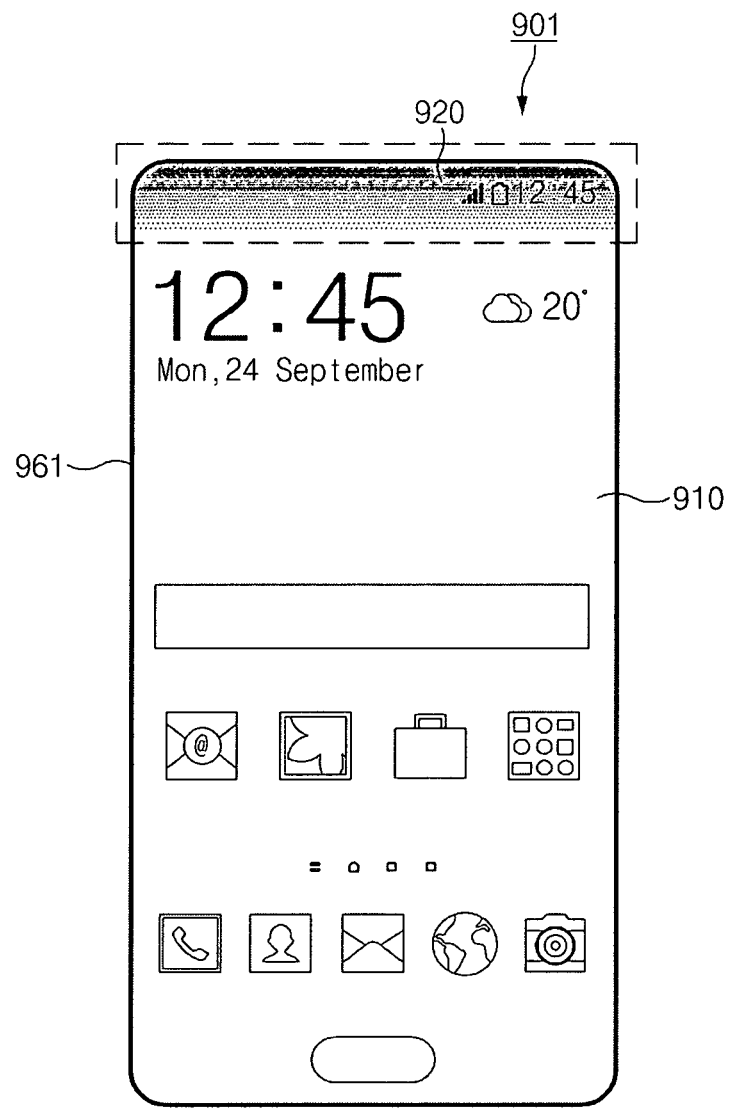
FIGS. 9A and 9B are other views for describing a method of applying a graphic effect, according to an embodiment.
Figure 9B:
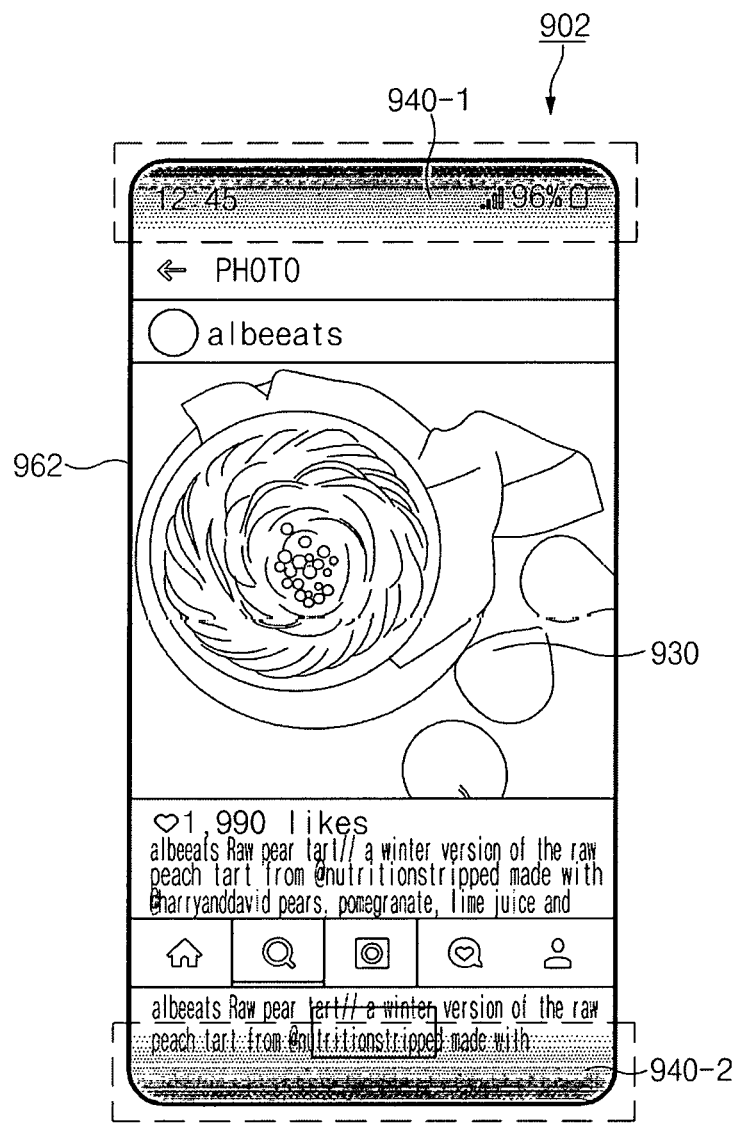

FIGS. 9A and 9B are other views for describing a method of applying a graphic effect, according to an embodiment.

Referring to FIG. 9A, the front surface of an electronic device 901 according to an embodiment may be composed of a display 910 and a housing 961 (or bezel). The processor of the electronic device 901 may apply a gradation effect to an upper side edge area 920 in the manner described in FIGS. 7 and/or 8. The user of the electronic device 901 may not be aware of the upper side boundary between the housing 961 (or bezel) and the display 910 due to the gradation effect. As such, the electronic device 901 may achieve the effect that the content display area (or screen) of the display 910 extends to the upper side of the housing 961.

Referring to FIG. 9B, the front surface of an electronic device 902 according to an embodiment may be composed of a display 930 and a housing 962 (or bezel). The processor of the electronic device 902 may apply the gradation effect, which is described in FIGS. 7 and/or 8, to an upper side edge area 940-1 and a bottom side edge area 940-2. The user of the electronic device 902 may not be aware of the upper/bottom side boundary between the housing 962 (or bezel) and the display 930 due to the gradation effect. As such, the electronic device 902 may achieve the effect that the content display area (or screen) of the display 930 extends to the upper/bottom side of the housing 962.

Figure 10:
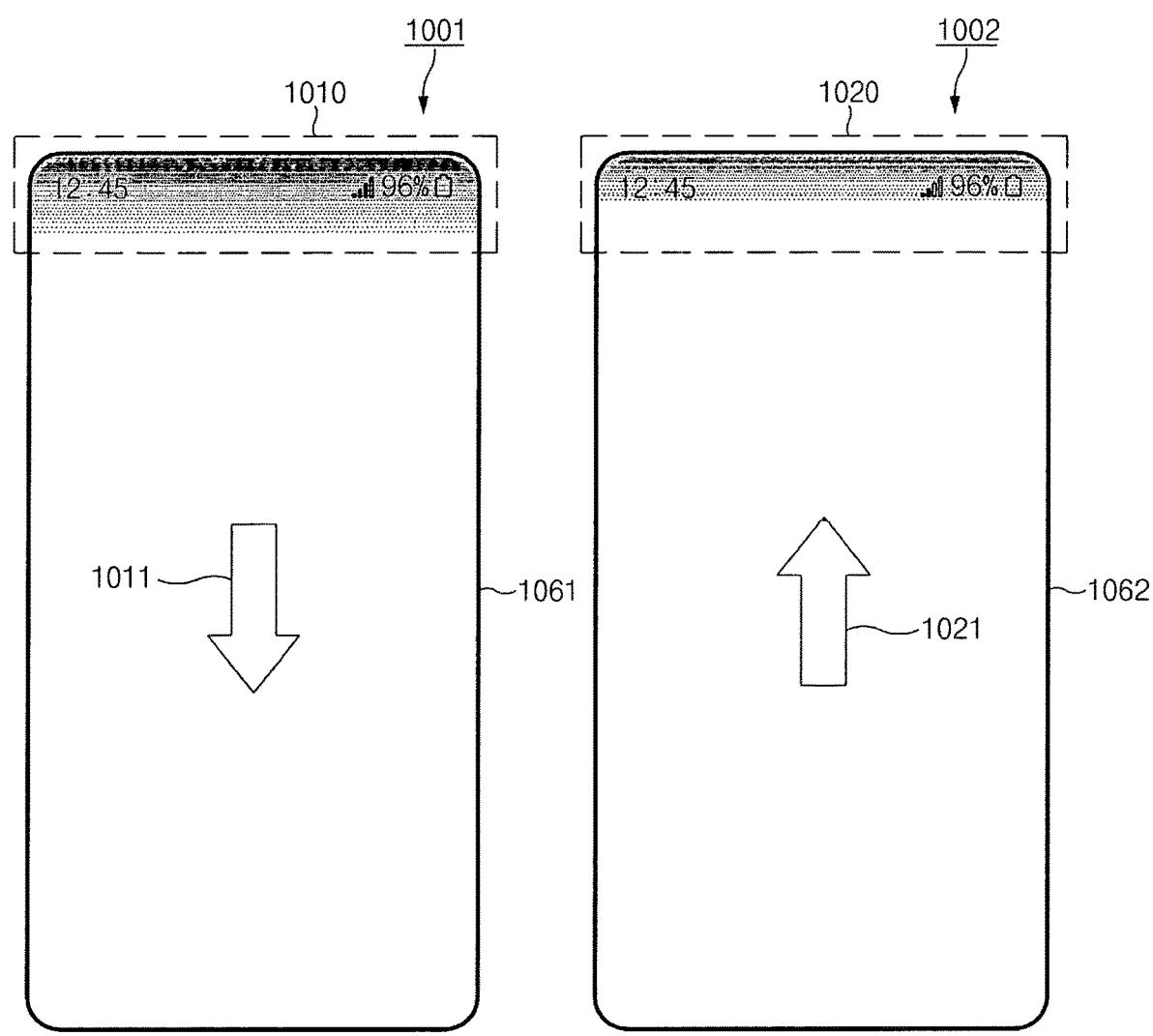
FIG. 10 is a view for describing a method of applying a graphic effect based on a user input.

FIG. 10 is a view for describing a method of applying a graphic effect based on a user input.

Referring to FIG. 10, a graphic effect applying method based on a user input according to an embodiment may be performed in electronic devices 1001 and 1002. According to an embodiment, the electronic devices 1001 and 1002 may adjust the weight of a color used to a gradation effect, depending on the user input.

For example, the gradation effect for transitioning from the color of a housing 1061 to the pre-extracted color may be applied to an upper side edge area 1010 of the electronic device 1001. According to an embodiment, a user may scroll (an example of a user input) the electronic device 1001 in a bottom side direction 1011. When the scrolling is made, the display area of content on a display may move in the bottom side direction 1011. At this time, when increasing the speed of the scrolling in the bottom side direction 1011, the electronic device 1001 may increase the weight, at which the color of the housing 1061 is occupied, in the gradation effect (decrease the weight at which the pre-extracted color is occupied).

For another example, the gradation effect for transitioning from the color of a housing 1062 to the pre-extracted color may be applied to an upper side edge area 1020 of the electronic device 1002. According to an embodiment, the user may scroll the electronic device 1002 in an upper side direction 1021. When the scrolling is made, the display area of content on a display may move in the upper side direction 1021. At this time, when increasing the speed of the scrolling in the upper side direction 1021, the electronic device 1002 may decrease the weight, at which the color of the housing 1062 is occupied, in the gradation effect (increase the weight at which the pre-extracted color is occupied).

According to various embodiments, the user input may include a touch input (so-called, 'force touch') having a specific pressure. For example, in the case where the force touch is received through a display (embedded with a pressure sensor), an electronic device may adjust the weight of a color used for the gradation effect based on the pressure of the force input.

Figure 11:
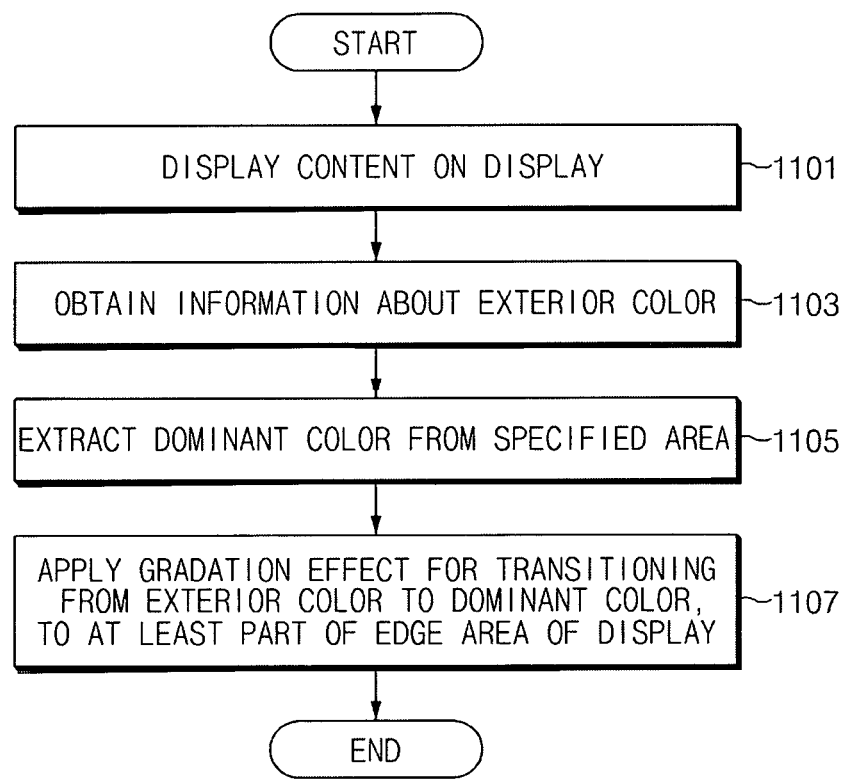
FIG. 11 is a flowchart of a method of applying a graphic effect, according to an embodiment.

FIG. 11 is a flowchart of a method of applying a graphic effect, according to an embodiment.

Referring to FIG. 11, a graphic effect applying method according to an embodiment may include operation 1101 to operation 1107. For example, operation 1101 to operation 1107 may be performed by the electronic device 601 of FIG. 6. Operation 1101 to operation 1107 may be respectively implemented with, for example, instructions that are capable of being performed (or executed) by the processor 650 of the electronic device 601. The instructions may be stored in, for example, a computer-readable recording medium or the memory 640 of the electronic device 601 illustrated in FIG. 6. Below, operation 1101 to operation 1107 will be described by using the reference numerals of FIG. 6.

In operation 1101, the processor 650 of the electronic device 601 may display content on the display 620.

In operation 1103, the processor 650 of the electronic device 601 may obtain information about an exterior color. For example, the processor 650 may obtain information about the color of the housing 660 from the memory 640 or may obtain information about the color of an external accessory from the external accessory through the accessory coupling structure 630.

In operation 1105, the processor 650 of the electronic device 601 may extract a dominant color from a specified area of an area in which content is displayed, in the display 620. According to various embodiments, the dominant color may include a plurality of colors. For example, in the case where the specified area is composed of pixels arranged in a plurality of rows and a plurality of columns, the processor 650 may extract the dominant color for each of the plurality of columns.

In operation 1107, the processor 650 of the electronic device 601 may apply a gradation effect for transitioning from an exterior color obtained in operation 1103 to the dominant color extracted in operation 1105, to at least part of the edge area of the display 620.

Figure 12:
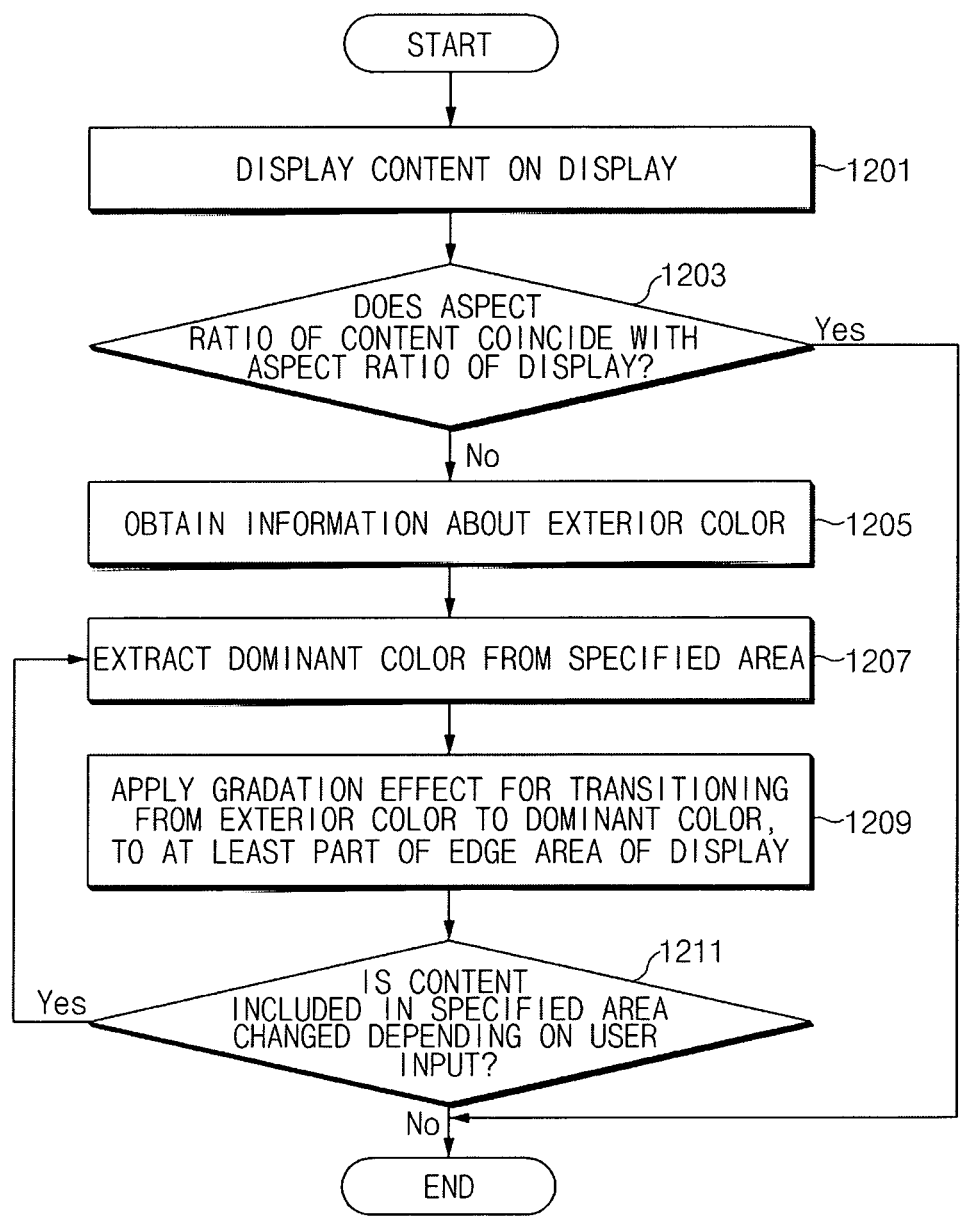
FIG. 12 is a flowchart of a method of applying a graphic effect, according to another embodiment.

FIG. 12 is a flowchart of a method of applying a graphic effect, according to another embodiment.

Referring to FIG. 12, a graphic effect applying method according to an embodiment may include operation 1201 to operation 1211. Operation 1201 to operation 1211 may be performed by, for example, the electronic device 601 illustrated in FIG. 6. Operation 1201 to operation 1211 may be respectively implemented with, for example, instructions that are capable of being performed (or executed) by the processor 650 of the electronic device 601. The instructions may be stored in, for example, a computer-readable recording medium or the memory 640 of the electronic device 601 illustrated in FIG. 6. The reference numeral of FIG. 6 may be used in a description of FIG. 12, and a description that is the same as described with reference to FIG. 11 may not be repeated here.

In operation 1201, the processor 650 of the electronic device 601 may display content on the display 620.

In operation 1203, the processor 650 of the electronic device 601 may determine whether a specified condition is satisfied. The specified condition may correspond to whether the aspect ratio of content to be displayed on the display 620 coincides with the aspect ratio of the display 620. For example, in the case where the aspect ratio of the content does not coincide with the aspect ratio of the display 620, the procedure may proceed to operation 1205. In the case where the aspect ratio of the content coincides with the aspect ratio of the display 620, the processor 650 of the electronic device 601 may end the process (i.e., the gradation effect may not be applied).

In operation 1205, the processor 650 of the electronic device 601 may obtain information about an exterior color.

In operation 1207, the processor 650 of the electronic device 601 may extract a dominant color from a specified area of an area in which content is displayed, in the display 620.

In operation 1209, the processor 650 of the electronic device 601 may apply a gradation effect for transitioning from an exterior color obtained in operation 1205 to the dominant color extracted in operation 1207, to at least part of the edge area of the display 620.

In operation 1211, the processor 650 of the electronic device 601 may determine whether the content included in the specified area is changed depending on a user input (e.g., scrolling, or the like). For example, in the case where the processor 650 determines that the content included in the specified area is changed in response to the user input, the processor 650 may return to operation 1207 and then may update the dominant color. In the case where the processor 650 determines that the content included in the specified area is not changed, the processor 650 may terminate the process (i.e., may maintain the existing gradation effect).

According to various embodiments, in operation 1211, the user input may include a scrolling input for changing the display area of the content in a specified direction, or a touch input ('force touch') of a specified pressure or more. The processor 650 may increase or decrease the occupancy rate of a dominant color (or exterior color) in the gradation effect, based on the speed of the scrolling input or the pressure of the force touch.

According to various embodiments of the present disclosure, an electronic device may provide an optical illusion effect that a display extends toward the outside of the bezel, by applying the gradation effect to the edge area of the display. In addition, the exterior color used for the gradation effect may be changed depending on the color of the coupled external accessory (e.g., a case, a band, or the like) as well as the color of the housing of the electronic device. As such, the electronic device may provide a more integrated design language between the display and the external accessory.

As described above, an electronic device according to an embodiment may include a display displaying content and a processor operatively connected to the display. The processor may be configured to obtain information about an exterior color, to extract a dominant color from a specified area among an area in which the content is displayed, and to apply a gradation effect for transitioning from the exterior color to the dominant color, to at least part of an edge area of the display.

In the electronic device according to another embodiment, the edge area may correspond to an area having a specified width toward an inside of the display from an outer boundary of the display.

In the electronic device according to another embodiment, the edge area may include an upper side edge area, a bottom side edge area, a left side edge area, and a right side edge area. The processor may be configured to apply the gradation effect to at least one of the upper side edge area and the bottom side edge area.

The electronic device according to another embodiment may further include a housing constituting at least part of an external appearance of the electronic device, wherein the housing is coupled to the display; the processor may be configured to obtain information about a color of the housing as information about the exterior color.

The electronic device according to another embodiment may further include a structure that allows an external accessory to be physically or electrically coupled to the electronic device. When the external accessory is coupled, the processor may be configured to obtain information about a color of the external accessory as information about the exterior color.

In another embodiment, the external accessory may include a case surrounding at least part of an external appearance of the electronic device.

In the electronic device according to another embodiment, when a specified condition is satisfied, the processor is configured to apply the gradation effect.

In the electronic device according to another embodiment, when an aspect ratio of the content to be displayed on the display does not coincide with an aspect ratio of the display, the processor may be configured to apply the gradation effect.

The electronic device according to another embodiment may further include a plurality of display driving integrated-circuits (DDIs) for driving the display. The processor may be configured to control a graphic output of the edge area through at least one of the plurality of DDIs and to control a graphic output of an area, in which the content is displayed, through another DDI different from the at least one DDI.

In the electronic device according to another embodiment, when the content included in the specified area is changed depending on a user input, the processor may be configured to update the dominant color.

In the electronic device according to another embodiment, the user input may correspond to scrolling for changing an area, in which the content is displayed, in a specified direction, and the processor may be configured to increase or decrease a ratio of the dominant color in the gradation effect, depending on a speed of the scrolling.

In the electronic device according to another embodiment, the display may further include a touch panel for receiving a touch input and a pressure sensor for detecting a pressure of the touch input. The processor may be configured to increase or decrease an occupancy ratio of the dominant color in the gradation effect, depending on the pressure of the touch input.

In the electronic device according to another embodiment, the specified area may be composed of pixels arranged in a plurality of rows and a plurality of columns. The processor may be configured to extract the dominant color for each of the plurality of columns and to apply the gradation effect based on the extracted plurality of dominant colors.

The graphic effect applying method according to an embodiment may include displaying content on a display, obtaining information about an exterior color, extracting a dominant color from a specified area among an area in which the content is displayed, and applying a gradation effect for transitioning from the exterior color to the dominant color, to at least part of an edge area of the display.

In the graphic effect applying method according to another embodiment, the obtaining of the information about the exterior color may include obtaining information about a color of a housing forming an appearance of the electronic device.

In the graphic effect applying method according to another embodiment, the obtaining of the information about the exterior color may include obtaining information about a color of an external accessory coupled to the electronic device.

In the graphic effect applying method according to another embodiment, applying the gradation effect may be performed when a specified condition is satisfied.

In the graphic effect applying method according to another embodiment, the specified condition may include the case where an aspect ratio of the content to be displayed on the display does not coincide with an aspect ratio of the display.

The graphic effect applying method according to another embodiment may further include updating the dominant color when the content included in the specified area is changed depending on a user input.

In the graphic effect applying method according to another embodiment, the user input may correspond to scrolling for changing an area, in which the content is displayed, in a specified direction. The graphic effect applying method may further include increasing or decreasing a ratio of the dominant color in the gradation effect, depending on a speed of the scrolling.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
 a display configured to display content;
 a housing coupled to the display; and
 a processor operatively connected to the display,
 wherein the processor is configured to:
  obtain information about an exterior color of the housing,
  extract a dominant color from a specified area of the display that displays a part of the content,
  determine a gradation effect based on the exterior color of the housing and the dominant color of the specified area,
  apply the gradation effect for transitioning from the exterior color to the dominant color, to at least part of an edge area of the display, and
  increase or decrease a ratio of the dominant color in the gradation effect based on a speed of a user input,
 wherein the edge area of the display is located between the specified area of the display and the housing, and
 wherein the user input corresponds to scrolling for changing an area, in which the content is displayed, in a specified direction.

2. The electronic device of claim 1, wherein the edge area corresponds to an area having a specified width toward an inside of the display from an outer boundary of the display.

3. The electronic device of claim 1,
 wherein the edge area includes an upper side, a bottom side, a left side, and a right side, and
 wherein the processor is further configured to:
  apply the gradation effect to at least one of the upper side or the bottom side.

4. The electronic device of claim 1, further comprising:
 a structure that allows an external accessory to be physically or electrically coupled to the electronic device,
 wherein the processor is further configured to, when the external accessory is coupled to the electronic device, obtain information about a color of the external accessory as the information about the exterior color.

5. The electronic device of claim 4, wherein the external accessory includes a case surrounding at least part of an external appearance of the electronic device.

6. The electronic device of claim 1, wherein the processor is further configured to, when a predefined condition is satisfied, apply the gradation effect.

7. The electronic device of claim 6, wherein the processor is further configured to, when an aspect ratio of the content does not coincide with an aspect ratio of the display, apply the gradation effect.

8. The electronic device of claim 1, further comprising:
a plurality of display driving integrated-circuits (DDIs) for driving the display,
wherein the processor is further configured to:
control a graphic output of the edge area through at least one of the plurality of DDIs, and
control a graphic output of an area, in which the content is displayed, through another DDI different from the at least one of the plurality of DDIs.

9. The electronic device of claim 1, wherein the processor is further configured to, when the content included in the specified area is changed based on the user input, update the dominant color.

10. The electronic device of claim 9,
wherein the display further includes a touch panel for receiving a touch input and a pressure sensor for detecting a pressure of the touch input, and
wherein the processor is further configured to increase or decrease an occupancy ratio of the dominant color in the gradation effect, based on the pressure of the touch input.

11. The electronic device of claim 1,
wherein the specified area includes pixels arranged in a plurality of rows and a plurality of columns, and
wherein the processor is further configured to:
extract a plurality of dominant colors for each of one or more of the plurality of columns or the plurality of rows, and
apply the gradation effect based on the extracted plurality of dominant colors.

12. The electronic device of claim 1, wherein the edge area of the display is an area lacking content.

13. The electronic device of claim 12, wherein processor is further configured to:
obtain an aspect ratio of the display,
determine an aspect ratio of the content,
based on the aspect ratio of the display not matching the aspect ratio of the content, determine the edge area, and
determine the specified area based on the edge area.

14. The electronic device of claim 1, wherein processor is further configured to:
control a first graphics processor to control the display of the gradation effect on the edge area of the display, and
control a second graphics processor to control the display of the content in the specified area of the display.

15. The electronic device of claim 1, wherein the user input comprises a scrolling input having a particular speed.

16. A graphic effect applying method of an electronic device, the method comprising:
displaying content on a display;
obtaining information about an exterior color of a housing of the electronic device coupled to the display;
extracting a dominant color from a specified area of the display that displays a part of the content;
determining a gradation effect based on the exterior color of the housing and the dominant color of the specified area;
applying the gradation effect for transitioning from the exterior color to the dominant color, to at least part of an edge area of the display; and
increasing or decreasing a ratio of the dominant color in the gradation effect based on a speed of a user input,
wherein the edge area of the display is located between the specified area of the display and the housing, and
wherein the user input corresponds to scrolling for changing an area, in which the content is displayed, in a specified direction.

17. The method of claim 16, wherein the obtaining of the information about the exterior color includes obtaining information about a color of an external accessory coupled to the electronic device.

* * * * *